US005682537A

United States Patent [19]
Davies et al.

[11] Patent Number: 5,682,537
[45] Date of Patent: Oct. 28, 1997

[54] OBJECT LOCK MANAGEMENT SYSTEM WITH IMPROVED LOCAL LOCK MANAGEMENT AND GLOBAL DEADLOCK DETECTION IN A PARALLEL DATA PROCESSING SYSTEM

[75] Inventors: John W. Davies, Shoreview, Minn.; John H. McClintock, Tigard, Oreg.

[73] Assignee: Unisys Corporation, Blue Bell, Pa.

[21] Appl. No.: 522,207

[22] Filed: Aug. 31, 1995

[51] Int. Cl.[6] .................................................... G06F 13/00
[52] U.S. Cl. .................................................. 395/726; 395/608
[58] Field of Search .................................. 395/608, 610, 395/726

[56] References Cited

U.S. PATENT DOCUMENTS

| | | | |
|---|---|---|---|
| 4,224,664 | 9/1980 | Trinchieri | 395/183.01 |
| 4,791,554 | 12/1988 | Hirota et al. | 395/673 |
| 4,819,159 | 4/1989 | Shipley et al. | 395/182.17 |
| 4,881,166 | 11/1989 | Thompson et al. | 395/608 |
| 5,060,144 | 10/1991 | Sipple et al. | 395/726 |
| 5,095,421 | 3/1992 | Freund | 395/671 |
| 5,117,352 | 5/1992 | Falek | 395/182.02 |
| 5,140,685 | 8/1992 | Sipple et al. | 395/491 |
| 5,161,227 | 11/1992 | Dias et al. | 395/674 |
| 5,175,851 | 12/1992 | Johnson et al. | 395/608 |
| 5,175,852 | 12/1992 | Johnson et al. | 395/608 |
| 5,182,808 | 1/1993 | Bagnoli et al. | 395/299 |
| 5,191,652 | 3/1993 | Dias et al. | 395/208.08 |
| 5,193,188 | 3/1993 | Franaszek et al. | 395/608 |
| 5,197,148 | 3/1993 | Blount et al. | 395/182.03 |
| 5,202,971 | 4/1993 | Henson et al. | 395/608 |
| 5,212,788 | 5/1993 | Lomet et al. | 395/617 |
| 5,226,143 | 7/1993 | Baird et al. | 395/472 |
| 5,226,159 | 7/1993 | Henson et al. | 395/608 |
| 5,301,290 | 4/1994 | Tetzlaff et al. | 395/469 |
| 5,303,368 | 4/1994 | Kotaki | 395/608 |
| 5,339,427 | 8/1994 | Elko et al. | 395/673 |

OTHER PUBLICATIONS

Ron Obermarck, Global Deadlock Detection Algorithm, Jun. 13, 1980, IBM Research Laboratory, San Jose, California 95193.

Williams, R. et al., "R*: An Overview of the Architecture" IBM Research, San Jose, CA, published in : Scheuermann, P. (ed.).

"Improving Database Usability and Responsiveness," 1982, Academic Press, Inc., New York, pp. 19–21.

DeWitt, D. et al, "Parallel Database Systems: The Future of High Performance Database Systems," Jun. 1992, vol. 35, No. 6 pp. 85–98. Communications of the ACM.

Gray, J., Operating Systems—An Advanced Course, Summer 1977, pp. 394, 450–547, IBM Research, San Jose, CA, R. Bayer et al. (ed.).

Menasce, D. A. et al, "Locking And Deadlock Detection In Distributed Databases," University of California, Los Angeles, CA, pp. 215–232.

Ortali, M., Database 2 for AIX Parallel Technology, Oct. 8, 1994, pp. 1–10, IBM Canda Ltd.

Primary Examiner—Glenn A. Auve
Attorney, Agent, or Firm—Charles A. Johnson; Mark T. Starr

[57] ABSTRACT

An object lock management system for use in a parallel data processing system where objects are accessible by processing activities on computing nodes within the parallel system. The system includes local lock control elements, where each of the local lock control element coordinates the locking of a predetermined set of objects. In particular, each local lock control element grants locks or queues lock requests in response to lock requests. Lock information is selectively reported to a global deadlock detector which performs deadlock detection. The global deadlock detector instructs the local lock control elements to release selected locks and queued lock requests upon detecting a deadlock. Lock information is reported to the global deadlock detector periodically and only for queued lock requests that have timed-out, whereby message traffic and processing overhead is reduced in the parallel system.

16 Claims, 12 Drawing Sheets

FIG. 1        MRC=MESH ROUTER CONTROL

FIG. 5

| REQUEST / STATE | E_LOCK(a) | R_LOCK(a) | E_UNLOCK(a) | R_UNLOCK(a) |
|---|---|---|---|---|
| NULL | E(a) | R(a) | ERROR | ERROR |
| E(a) | E(a) | ERROR | NULL | ERROR |
| R(a) | E(a) | R(a) | ERROR | NULL |
| E(b) | E(b)<QE(a) | E(b)<QR(a) | ERROR | ERROR |
| R(b) | R(b)<QE(a) | R(b)<R(a) | ERROR | ERROR |
| E(c)<QR(b) | E(c)<QR(b)<QE(a) | E(c)<QR(b)<QR(a) | R(b) | ERROR |
| E(c)<QE(b) | E(c)<QE(b)<QE(a) | E(c)<QE(b)<QR(a) | E(b) | ERROR |
| R(b)<R(c) | R(b)<R(c)<QE(a) | R(b)<R(c)<R(a) | ERROR | R(b) |
| R(b)<R(b) | R(b)<QU(a) | R(a)<R(b) | ERROR | ERROR |
| R(b)<QU(c) | R(b)<QU(c)<QE(a) | R(b)<QU(c)<QR(a) | ERROR | ERROR |
| R(a)<QU(b) | DEADLOCK | R(a)<QU(b) | ERROR | E(b) |

E_LOCK(a) IS A REQUEST BY TRANSACTION a FOR AN EXCLUSIVE LOCK
R_LOCK(a) IS A REQUEST BY TRANSACTION a FOR A READ LOCK
E_UNLOCK(a) IS A REQUEST BY TRANSACTION a TO RELEASE AN EXCLUSIVE LOCK
R_UNLOCK(a) IS A REQUEST BY TRANSACTION a TO RELEASE A READ LOCK
(a),(b) AND (c) DENOTE DIFFERENT TRANSACTION x
E(x)=EXCLUSIVE LOCK FOR TRANSACTION x
R(x)=READ LOCK (NOT EXCLUSIVE) FOR TRANSACTION x
QE(x)=QUEUED EXCLUSIVE LOCK REQUEST BY TRANSACTION x
QR(x)=QUEUED READ LOCK REQUEST BY TRANSACTION x
QU(x)=QUEUED UPGRADE REQUEST BY TRANSACTION x
NULL=NO LOCK
ERROR= USER ERROR AS THE RESULT OF INCORRECT FUNCTION USAGE OR FUNCTION CALLING PARAMETERS

| DATABASE SERVER NODE 62a | QUEUED REQUEST COUNT | |
|---|---|---|
| Txn t(128a) | QUEUED ACTIVITY ID m | Txn z |
| Txn t(128a) | QUEUED ACTIVITY ID m | Txn w |
| | (QUEUED-REQUESTS PACKET) | |
| Txn u(128b) | QUEUED ACTIVITY ID n | Txn z |
| Txn u(128b) | QUEUED ACTIVITY ID n | Txn w |
| Txn v(128c) | QUEUED ACTIVITY ID p | Txn x |
| Txn v(128c) | QUEUED ACTIVITY ID p | Txn y |

FIG. 11

ND DEADLOCK
OBJECT LOCK MANAGEMENT SYSTEM WITH IMPROVED LOCAL LOCK MANAGEMENT AND GLOBAL DEADLOCK DETECTION IN A PARALLEL DATA PROCESSING SYSTEM

BACKGROUND

1. Field of the Invention

This invention generally relates to concurrency control in parallel data processing systems, and more particularly to object lock management in parallel data processing systems. The new concurrency control employs local lock control elements to coordinate the locking of objects that are local to the respective lock control elements and a central deadlock detector for detecting deadlocks.

2. Description of the Prior Art

New object locking mechanisms have evolved, partly in response to new hardware and software architectures. Architectures including multiple processors with shared memory, multiple processors with no shared memory and shared disks, and most recently parallel processors sharing nothing have led to new developments in lock management. The newest object locking mechanisms are being developed to achieve maximum performance from today's parallel and distributed processing architectures.

Database management systems provide a good example of the concept of and need for lock management. In addition, the present invention is implemented in a database management system. Therefore, the concepts of the present invention will be discussed in the context of database management systems.

Concurrency control is provided in a database management system to coordinate concurrent access to a database. An exemplary application where concurrent access is required is an airlines reservation system where multiple reservations are being requested concurrently. A "transaction" is the generalization of the exemplary airline reservation. To ensure database integrity, a locking mechanism is used to coordinate database updates. Only one transaction at a time is allowed update access to an object in a database. Prior to reserving a particular seat on a particular flight for a particular passenger, a transaction must obtain a lock on the identified object in the database. During the time that the lock is held by a transaction, no other transactions are allowed update privileges on the object, and any additional lock requests are queued until the object is unlocked.

In systems where transactions that make lock requests are queued if there is an existing lock on an object, steps must be taken to address deadlock scenarios. An example deadlock is transaction $T_1$ holding a lock on object $O_1$ and queued on a lock request for object $O_2$, and transaction $T_2$ holding a lock on $O_2$ and queued on a lock request for $O_1$. Transactions $T_1$ and $T_2$ are deadlocked because $T_1$ is queued and waiting for $T_2$ to release the lock on $O_2$, and $T_1$ is queued and waiting for $T_1$ to release the lock on $O_1$. The database system must provide a mechanism to ensure that either a deadlock does not develop, or if a deadlock does develop, steps are taken to detect the deadlock and restart one of the transactions involved in the deadlock.

The database locking mechanisms of yesterday's database systems are less than optimal for today's distributed and parallel database technology in client/server computing environments. In the client/server computing model, client programs issue requests to server programs, and server programs respond to the requests by returning data or taking predetermined actions depending upon the request. The client and server programs may be resident on the same or different machines. Interprocess communication is typically via message exchange. In distributed database systems, one or more databases are typically stored on different systems and at different sites. The systems are interconnected via networks. Parallel database systems store one or more databases on multiple storage devices in a data processing system with a parallel processing architecture. A shared characteristic of distributed and parallel database systems is that multiple database managers are active. One or more database managers may be active on any given computing node within the system. Each database manager acts as a server for the data under the control of the database manager. Client applications may be active on computing nodes that are the same ones as or ones different from the database managers in the distributed or parallel system.

Prior art database locking mechanisms are not suited for distributed and/or parallel database systems performing on-line transaction processing applications. On-line transaction processing typically involves the processing of a very large number of requests for access to a database where operators wait on-line for a response. In shared memory systems, database locking is relatively straight forward because locks may be maintained and deadlocks can be detected in the shared memory. In distributed and parallel systems, the computing nodes typically do not share memory and instead rely on message passing for the sharing of information. The processing overhead associated with message passing for the coordination between hundreds of computing nodes must be considered when there are a very large number of transactions being processed in a distributed or parallel system. If the issue of overhead is ignored, the performance advantages of parallel processing may be offset by the message passing overhead.

A number of approaches for concurrency control are known, but none is ideally suited for on-line transaction processing in a distributed or parallel database system. In U.S. Pat. No. 5,193,188, entitled, *Centralized and Distributed Wait Depth Limited Concurrency Control Methods and Apparatus*, to Franaszek et at. (hereinafter, Franaszek), local concurrency control managers and multiple global concurrency control managers are used. The local concurrency control managers queue transactions to wait for database objects at the respective computing nodes and report the waiting transactions to the global concurrency control whenever a wait is scheduled. The global concurrency control determines whether a transaction should be restarted based on waiting and starting time information for the transaction. Franaszek does not detect deadlock, but rather aborts transactions based on the time that a transaction has been waiting for a lock for a database object. The Franaszek approach has two disadvantages: (1) there may be excessive message passing because wait information is reported whenever a transaction is queued for a lock; and (2) transactions my be unnecessarily restarted because a transaction is restarted based on time rather than on an actual deadlock situation.

Kotaki, in U.S. Pat. No. 5,303,368 (hereinafter, Kotaki) entitled, *Dead Lock Preventing Method for Data Base System*, suggests a system where lock management is performed at each of a plurality of workstations. To prevent deadlock, the list structures for lock management are duplicated at each of the workstations. Deadlock situations are checked each time a lock cannot be granted. In a parallel or distributed on-line transaction processing system, the Kotaki approach results in unnecessary overhead if it is assumed that deadlock situations are the exception and not the rule.

It is wasted processing to check for deadlock whenever a lock cannot be granted if deadlocks are a rare occurrence. In most transaction systems there is an acceptable level of transaction queuing, the object in contention is eventually released, and deadlocks do not develop. Therefore, it would be inefficient to check for deadlock each time a transaction is queued to wait for a lock.

Concurrency control in distributed transaction processing systems is briefly discussed by R. Williams et al. in the paper entitled, *R\*: An Overview of the Architecture*, (hereinafter, Williams). The idea discussed by Williams is that every site in the distributed system does periodic deadlock detection based on local lock information and lock information received from other sites. A list of waiting transactions is passed from site-to-site in an attempt identify deadlocks. The Williams method, like the Franaszek and Kotaki methods, introduces unnecessary overhead in an on-line transaction processing system. Extra overhead is introduced by having every site perform deadlock detection and in the coordination that must take place between the sites in identifying which locks exist and which have been released.

The paper, *Notes on Data Base Operating Systems*, by Jim Gray which was published in the book, *Operating Systems An Advanced Course*, ed., R. Bayer, discusses deadlock issues in a distributed system. Gray suggests local deadlock detectors periodically reporting all potential deadlock paths within the local node to a global deadlock detector. The global deadlock detector periodically collects the messages, identifies global deadlocks, and selects transactions to terminate. Gray has no further discussion of further optimizing the processing of the local deadlock detectors and the global deadlock detector.

SUMMARY OF THE INVENTION

As the trend toward parallel and distributed database architectures continues, so does the need for efficient concurrency control. The known concurrency control mechanisms exhibit the shortcomings of excessive message passing and unnecessarily restarted transactions. The advantages of the present invention may be understood by way of contrasting the present invention with the concepts described in the article by Gray.

Gray indicates that there are three basic ways to address the issue of deadlock: time-out, deadlock prevention, and deadlock detection. Under the time-out approach, if an activity waits for a resource for more than a prescribed period of time, deadlock is presumed and the activity is not allowed to wait any longer (it may be terminated). Deadlock prevention does not allow a deadlock situation to develop, e.g., no activities are allowed to wait. The deadlock detection approach allows a deadlock to develop, but takes corrective measures once the deadlock occurs and the deadlock is detected. The present invention uses an enhanced deadlock detection approach.

Gray goes on to explain that deadlock detection may be performed periodically or whenever any activity waits. The cost of detecting a deadlock late should be weighed against the cost of continually maintaining a wait-for graph when deciding on an approach.

In a distributed system, Gray suggests using a periodic global deadlock detector in combination with local deadlock detectors to detect global deadlocks. The local deadlock detectors periodically report waiting activity information to the global deadlock detector, which in turn periodically checks for global deadlocks.

The concepts of Gray are less than optimal in two respects. First, long running transactions (i.e., those that take a long time to complete) may result in unnecessary reporting by Gray's local deadlock detectors. Second, because the reporting that is done by the local deadlock detectors is purely periodic, all activities that happen to be waiting at the time of the periodic reporting are reported to the global deadlock detector, without regard to the length of time that the activities have been waiting. In both respects the result is unnecessary reporting to the global deadlock detector (excess network traffic) and excess processing by the global deadlock detector in looking for deadlocks. The present invention alleviates both deficiencies.

The present invention uses a time-out concept that is not present in Gray and combines the new time-out concept with periodic reporting of timed-out waiting activities to achieve greater deadlock detection efficiency than that described by Gray. In the modified timed-out concept of the present invention, activities that have been waiting for longer than a prescribed period of time are periodically reported to a global deadlock detector. In contrast, the time-out concept discussed by Gray involves denying a lock request to an activity that has been timed-out.

The deficiencies of long running transactions resulting in unnecessary reporting by the local deadlock detectors, and the reporting to the global deadlock detector activities that have only recently begun waiting are addressed by the present invention. In regards to long running transactions, the predetermined time-out period may be adjusted to accommodate long running transactions. The global deadlock detector can keep statistics on queued locks, for example, calculate the percentage of repeating queued requests. If 80% or more of the queued requests are repeats and no deadlocks have been detected, then the time-out interval can be doubled. This can reduce the reporting of transactions that are waiting for locks held by long running transactions. In regards to reporting activities that have not been waiting for longer than the predetermined period of time, the activities are not reported to the global deadlock detector, even though the time for the periodic reporting has arrived (unless the time-out period has elapsed). This eliminates unnecessary reporting of transactions just because they happen to be waiting at the time of the periodic reporting.

Therefore it would be desirable for a lock management system in a parallel data processing system to minimize the message traffic required for efficient lock management and to efficiently detect deadlocks.

It is an object of the invention to minimize message traffic in a lock management system for a parallel data processing system.

A further object of the invention is to reduce processing overhead in managing locks in a parallel data processing system.

Another object is to periodically report lock information to a global deadlock detector.

Yet another object is to only report lock information for lock requests that have been queued for longer than a predetermined period of time.

These and other objects are attained in a parallel data processing system having multiple computing nodes that are interconnected via a mesh network and multiple processing activities on the computing nodes. The system includes multiple local lock control elements, where each of the local lock control elements coordinates the locking of a predetermined set of objects. In particular, each local lock control element grants locks or queues lock requests in response to the lock requests it receives from the processing activities. Lock information is selectively reported to a global deadlock detector which performs deadlock detection. The global deadlock detector instructs the local lock control elements to release selected locks and queued lock requests upon detecting a deadlock.

Lock processing overhead and message traffic are reduced in two ways. First, not all lock information related to queued lock requests is transmitted to the global deadlock detector. Rather, only lock information that is associated with queued lock requests that have been waiting for longer than a predetermined period of time are reported. This allows a processing activity that requires an object to be locked for an extended period of time to complete its processing without needlessly reporting the associated lock information to the global deadlock detector.

Second, because deadlock is viewed as a rare occurrence, the reporting of lock information to the global deadlock detector and the detecting of deadlocks is only performed periodically. This effectively reduces the processing overhead involved in lock management.

In another aspect of the invention, the local lock managers utilize improved lock management data structures to efficiently report lock information to the global deadlock detector. In the improved data structures, the queued lock requests are interlinked with data structures for locks that have been granted. The interlinking of the different types of structures simplifies the process of identifying the queue lock requests and the owners of the locks upon which the queued lock requests are waiting.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 5 is a state table of the actions taken for lock and unlock requests for a database object;

FIG. 11 illustrates the Queued-Requests Packet that would be submitted for the example of FIG. 6;

DETAILED DESCRIPTION

The present invention is described in the context of a scaleable parallel processing system with a parallel database management system. It should be understood that the illustrated embodiment is not intended to restrict the scope of the claimed invention. Those skilled in the art will recognize that the invention could also be utilized in distributed systems and applied in areas other than database management systems.

Figure 1:
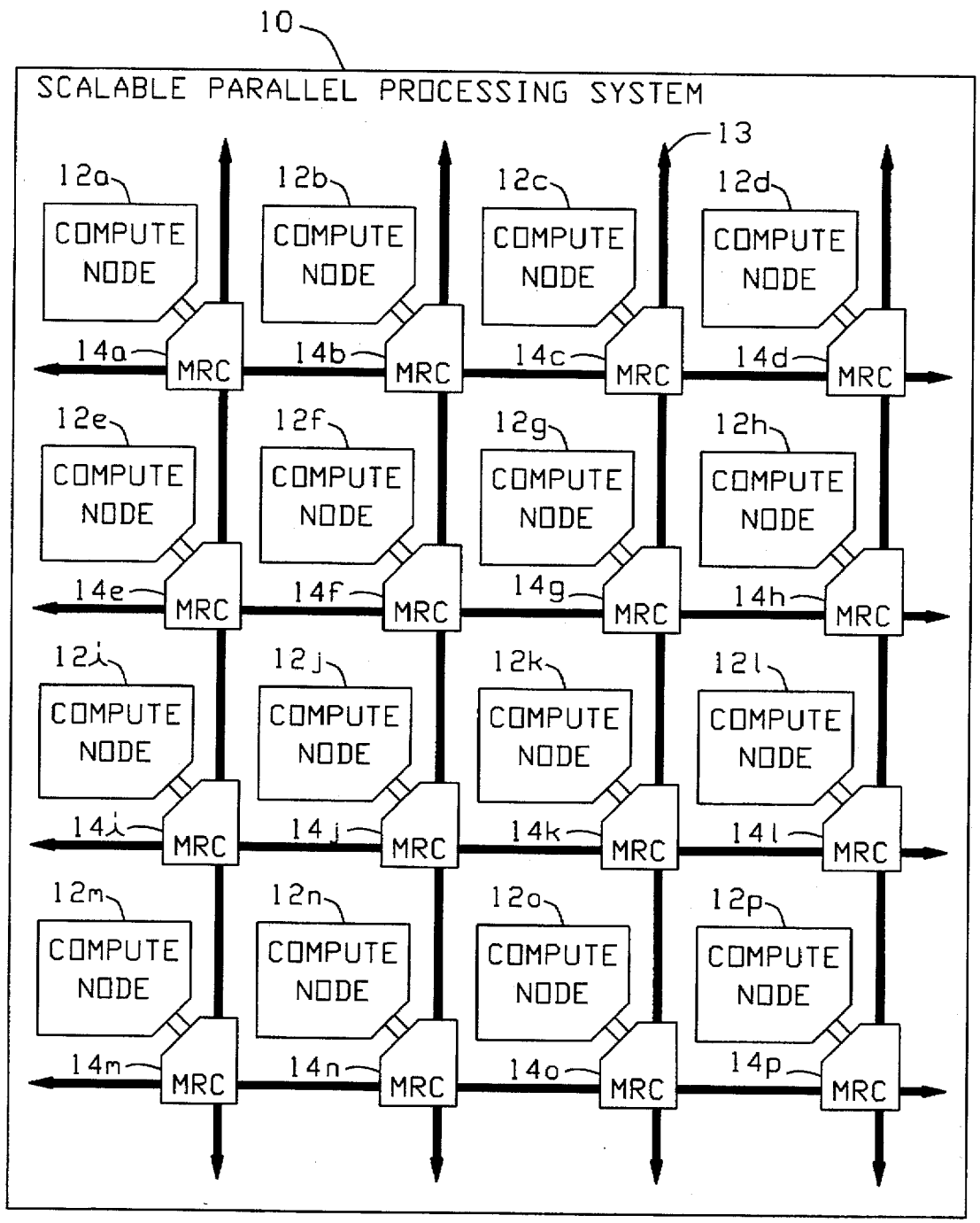
FIG. 1 is a block diagram of an exemplary Scaleable Parallel Processing System in which the present invention could be used.

FIG. 1 is a block diagram of an exemplary Scaleable Parallel Processing System 10 (hereinafter "Parallel System") in which the present invention could be used. The Parallel System 10 that is illustrated is commercially available from Unisys Corporation as the OPUS product. The Parallel System is scaleable in processing power, interconnect bandwidth, input/output bandwidth, mass storage capacity, and operating and database management systems.

Each of the Compute Nodes 12a–p includes an Intel Pentium® processor along with local memory and input/output control. The Compute Nodes are interconnected via a high performance Mesh Network 13. Each of the Compute Nodes is coupled to an associated one of the Mesh Router Controls 14a–p. Each of the Mesh Router Controls is coupled to four others of the Mesh Router Controls. The Mesh Router Control includes five bi-directional data ports, one for the associated Compute Node and four for connections to four other Mesh Router Controls. Each of the data ports is 16 bits wide. The channel bandwidth is 175 MB/s. Each Mesh Router Control is capable of simultaneously routing four messages. The Parallel System is scaleable in increments of four Compute Nodes 12.

Figure 2:
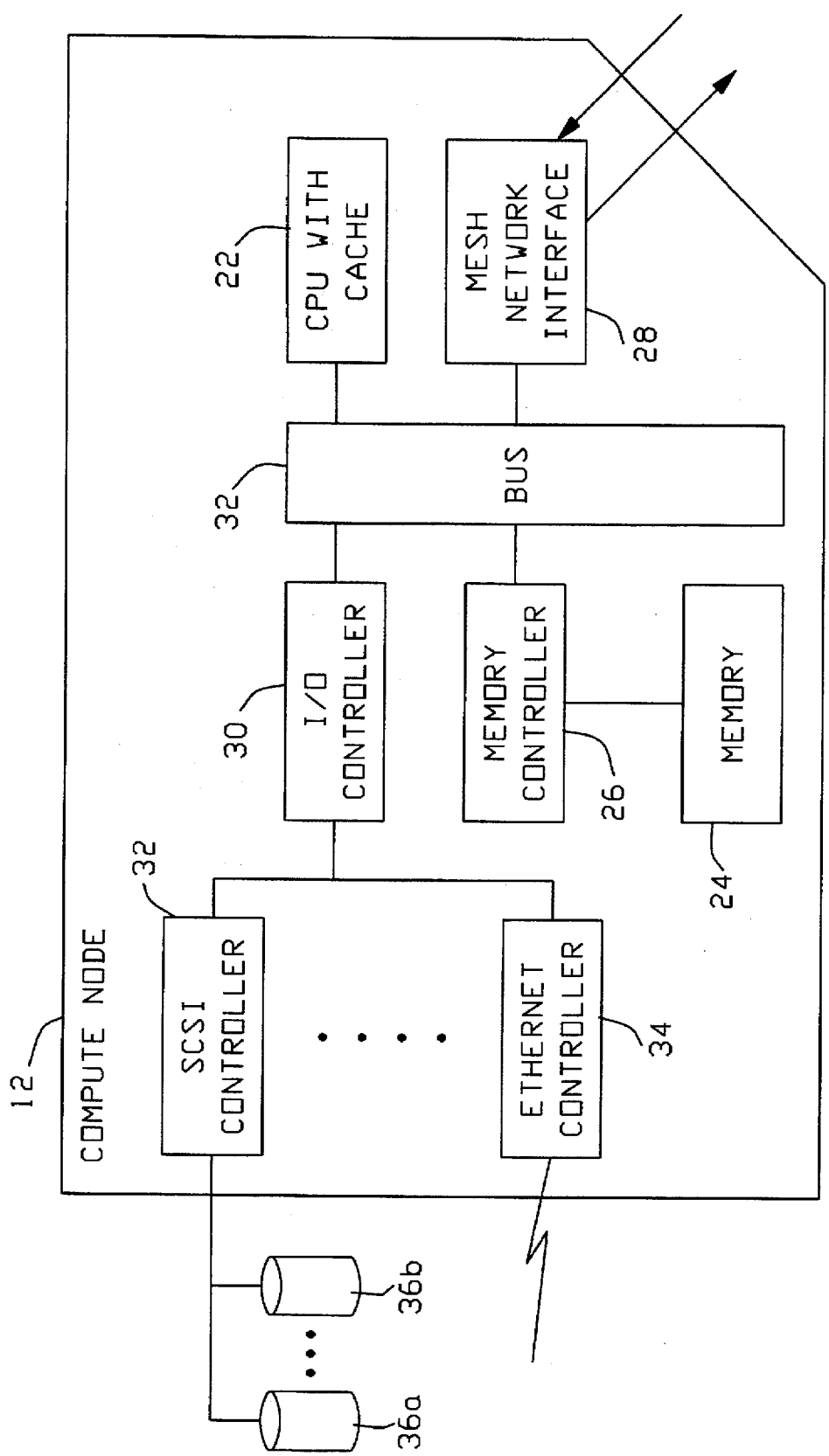
FIG. 2 is a block diagram of a Compute Node.

FIG. 2 is a block diagram of a Compute Node 12. The Compute Node includes a CPU 22 with cache storage, a Memory 24 and associated Memory Controller 26, and a Mesh Network Interface 28. For input and output functions required of the Compute Node, an I/O Controller 30 is included. The major functional components are interconnected via the Bus 32.

The Mesh Network Interface 28 provides bi-directional communication between the Compute Node 12 and an associated one of the Mesh Router Controls 14a–p. The I/O Controller 30 is coupled to optional device controllers such as the illustrated SCSI Controller 32 and Ethernet Controller 34. The SCSI Controller may in turn control one or more SCSI Disks 36a–b.

Figure 3:
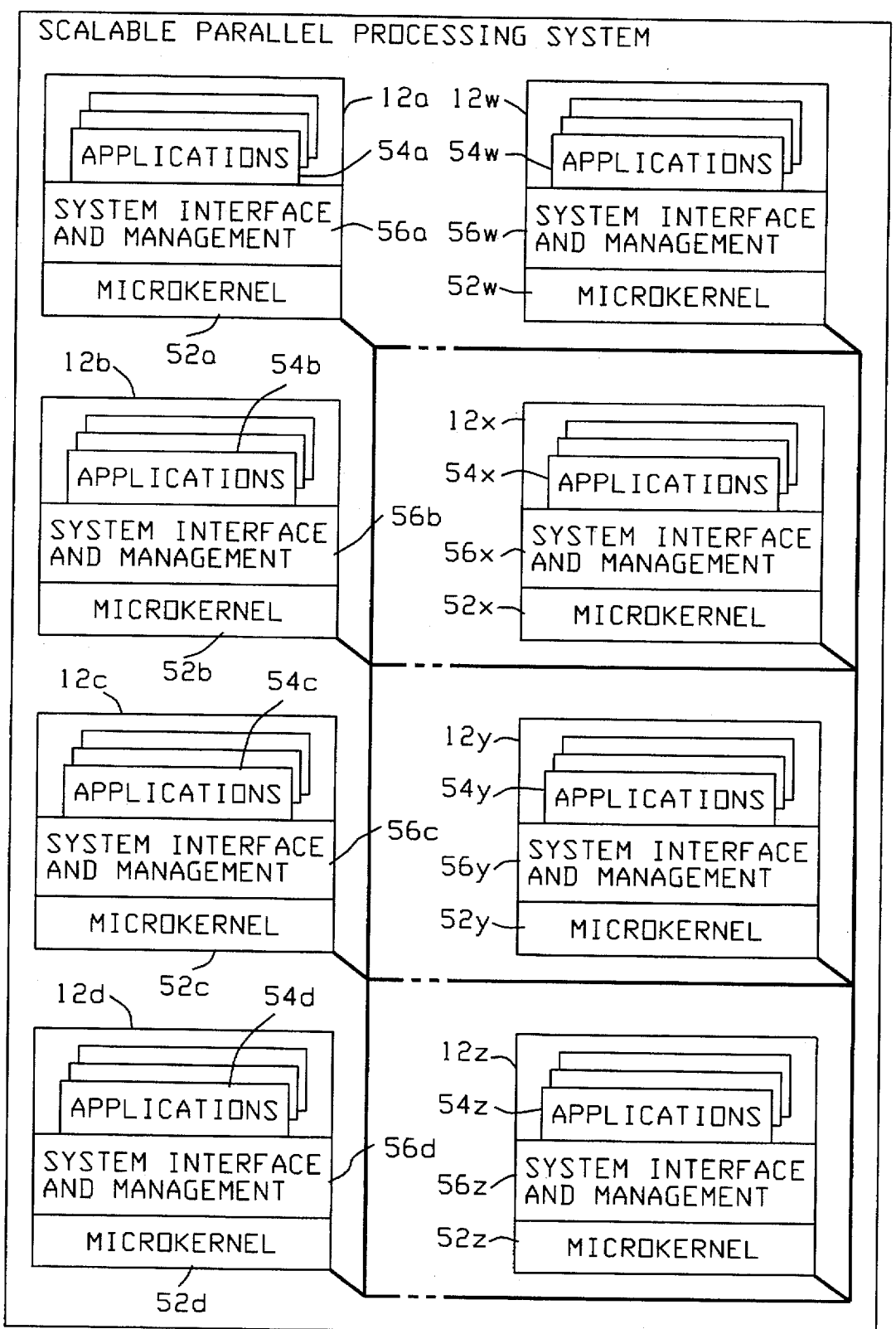
FIG. 3 is a block diagram of the software architecture of the Scaleable Parallel Processing System.

FIG. 3 is a block diagram of the software architecture of the Scaleable Parallel Processing System 10. Each of the illustrated Compute Nodes 12a–d and 12w–z includes a Microkernel software component illustrated as 52a–d and 52w–z. Sets of optional Applications 54a–d and 54w–z execute on a respective ones of the Compute Nodes 12a–d and 12w–z. System Interface and Management software components, illustrated as 56a–d and 56w–z, are available for respective ones of the sets of Applications on the respective Compute Nodes.

Each of the respective Microkernel software components 52a–d and 52w–z includes interrupt handling, input/output management, and interface software for the Mesh Network 13. The System Interface and Management software components 56a–d and 56w–z include device handlers for various i/o devices, file management, process control, and memory management functions.

Separation of the functions of the System Interface and Management software 56a–d and 56w–z from the functions of the respective Microkernel software components 52a–d and 52w–z provides flexibility in system configuration. For example, if selected ones of the Compute Nodes 12a–d and 12w–z are to be dedicated to i/o for a particular type of device, only the necessary device handlers would be required on the selected Compute Nodes.

Database Server instances can exist on multiple nodes and use standard interprocess communication to perform parallel database functions.

Figure 4:
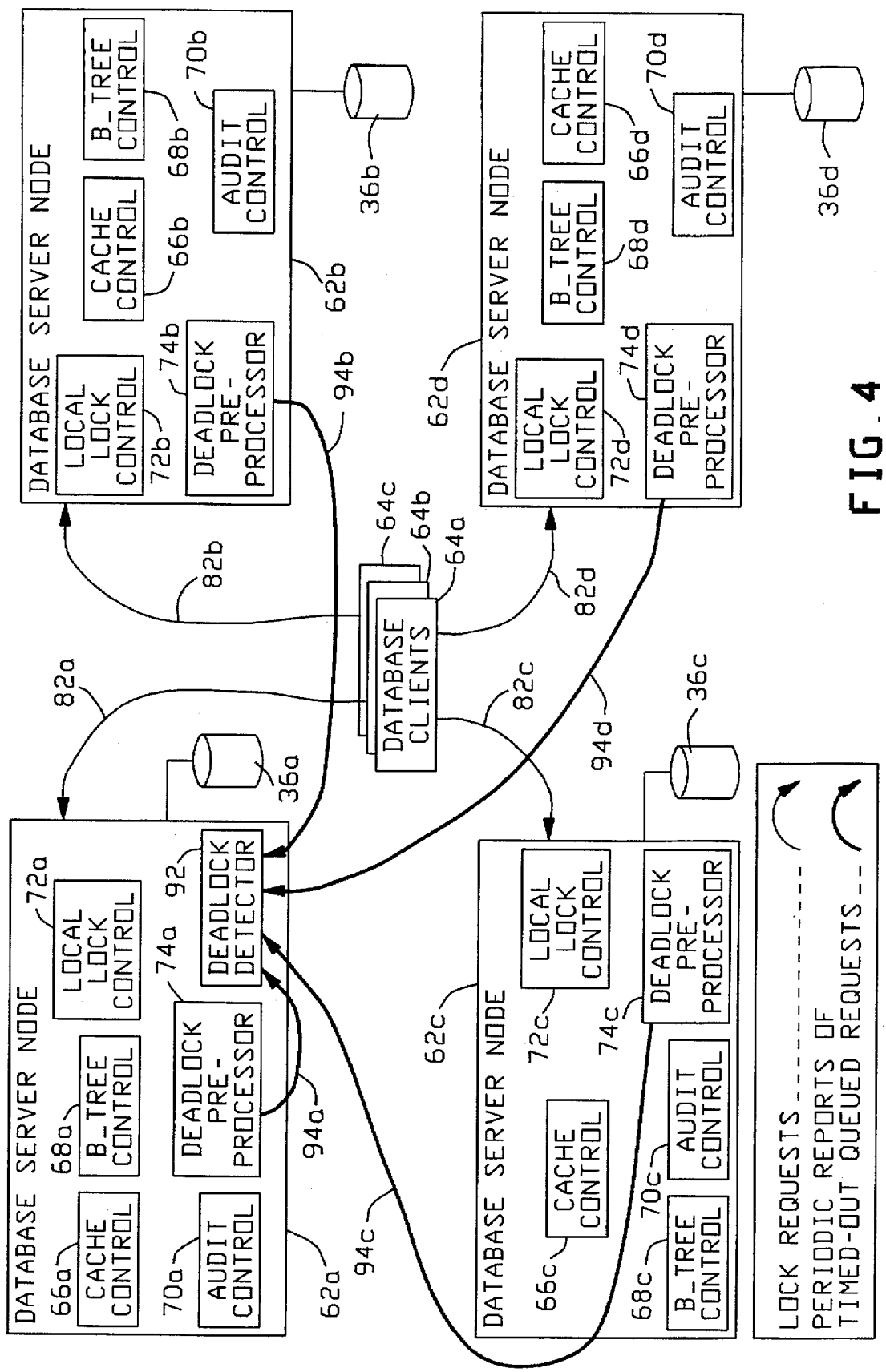
FIG. 4 is a block diagram of a parallel database system in which the present invention is used for concurrency control.

FIG. 4 is a block diagram of a parallel database system in which the present invention is used for concurrency control. For purposes of illustration, four Database Server Nodes 62a–d are shown. The Database Server Nodes are logical nodes, in contrast to the physical Compute Nodes 12a–p. That is, there may be one or more active Database Server Nodes on a single Compute Node. Each of the Database Server Nodes services requests for access to databases under control of the respective Database Server Nodes and stored on respective ones of the Disks 36a–d. Database access requests are issued from Database Clients 64a–c. The Database Client may be active on any predetermined one of the Compute Nodes or on a separate data processing system.

Each of the respective Database Server Nodes 62a–d includes various control elements for managing the respective databases. The control elements include Cache Control 66a–d, B-tree Control 68a–d, Audit Control 70a–d, Local Lock Control 72a–d, and Deadlock Preprocessor 74a–d. The particular functions performed by the Cache Control, B-tree Control, and Audit Control elements are well known and beyond the scope of the present invention. They are shown, however, to illustrate the context in which the invention is embodied.

With reference to the Local Lock Control elements 72a–d, each Local Lock Control provides concurrency control for the database objects managed by the respective one of the Database Server Nodes 62a–d. Local Lock Control eliminates sending messages to a central lock manager to resolve conflicts or broadcasting lock requests to all other Database Server Nodes.

When a Database Client 64a–c requires a lock on a database object, a lock request is sent to the appropriate one of the Local Lock Control elements 72a–d. The thin directional lines 82a–d illustrate various lock requests to the Database Server Nodes 62a–d. Lock Request 82a is a lock request from Database Client 64b to a Database Server Node 62a, Lock Request 82b is a lock request from Database Client 64c to a Database Server Node 62b, Lock Request 82c is a lock request from Database Client 64a to a Database Server Node 62c, and Lock Request 82d is a lock request from Database Client 64a to a Database Server Node 62d. Lock request 82a is processed by Local Lock Control 72a, Lock request 82b is processed by Local Lock Control 72b, Lock request 82c is processed by Local Lock Control 72c, and Lock request 82d is processed by Local Lock Control 72d.

Each of the respective Local Lock Control elements 72a–d governs whether a lock request will be granted or queued. For example, if Local Lock Control 72a determines that Lock Request 82a seeks a lock that conflicts with a lock that is already granted, Lock Request 82a is queued by the Local Lock Control 72a. A consequence of queuing Lock Request 82a is that the transaction associated with the Lock Request is queued and the Database Client 64b is forced to wait for the lock to be granted.

It is possible for a deadlock to develop in a parallel database system such as that illustrated in FIG. 4. Therefore, if a deadlocks develops, it must not be allowed to persist. An example deadlock involving more than two Database Server Nodes is as follows: Assume that database object $O_a$ is managed by Database Server Node 62a and an exclusive lock is presently owned by Database Client 64a, object $O_b$ is managed by Database Server Node 62b and an exclusive lock is presently owned by Database Client 62b, and object $O_c$ is managed by Database Server Node 62c and an exclusive lock is presently owned by Database Client 64c. If Client 64a issues a lock request for $O_b$, Client 64b issues a lock request for $O_c$, and Client 64c issues a lock request for $O_a$, a deadlock will be created. The deadlock is that Client 64a is waiting for $O_b$ from Client 64b which is waiting for $O_c$ from Client 64c which is waiting for $O_b$ from Client 64a.

The mechanism used by the present invention to deal with deadlocks is to have Deadlock Preprocessor elements 74a–d periodically report queued lock requests to a central Deadlock Detector element 92. The thick directional lines 94a–d illustrate the reporting of queued locks requests from the respective Local Lock Control 72a–d to the Deadlock Detector 92. The Deadlock Preprocessor elements report only those lock requests that have been queued for longer than a predetermined period of time. The Deadlock Detector periodically receives the queued lock requests and checks for deadlocks. If a deadlock is detected, the Deadlock Detector instructs a Local Lock Control to release locks held by the lock requester and to release the timed-out queued lock requests, and a deadlock status is returned to the transaction that initiated the lock request.

FIG. 5 is a state table of the actions taken for lock and unlock requests for a database record. The processing of the Local Lock Control elements follows the rules of FIG. 5. The left column contains the present state and the top row indicates a type of request. Each of the entries in the table indicates the next state. The notation used in the table is explained in the legend below the table. To simplify explanation of the present invention, read locks are assumed to be sharable and write locks are assumed to be exclusive. The following notes are provided for further explanation of FIG. 5. The bold heading at the beginning of each paragraph indicates the present state.

State: NULL

If transaction a issues either an exclusive-lock or read-lock request, the respective lock is granted. An unlock request by transaction a results in an error condition.

State: E(a)

If transaction a submits an exclusive-lock request, then no new lock is granted. However, a use-count that is associated with the exclusive-lock and transaction is incremented. If transaction a submits a read-lock request, an error condition results. A release request for an exclusive lock, E_Unlock (a), results in the NULL state when the use-count associated with the transaction and exclusive-lock is zero. An error condition results when transaction a issues a release request for a read-lock when a holds an exclusive-lock.

State: R(a)

An exclusive-lock request (E_lock (a)) results in an existing read-lock for the same transaction (R(a)) being changed to an exclusive-lock state (E(a)). If a read-lock request is issued, no new lock is granted, however, the use-count associated with the record and transaction is incremented. An error condition results if transaction a issues a release request for an exclusive-lock if a does not hold an exclusive-lock. The next state is NULL if a issues a release read-lock request.

State: E(b)

If transaction b holds an exclusive-lock and transaction a requests an exclusive-lock, the exclusive-lock request of transaction a is queued behind the exclusive-lock of transaction b (designated as E(b)<QE(a)). Similarly, a read-lock request by transaction a results in the read-lock request of transaction a being queued behind the exclusive-lock of transaction b. Error conditions result if transaction a issues a release lock request (E_Unlock(a) or R_Unlock(a)) and transaction a does not hold such a lock.

State: R(b)

Either an exclusive-lock request or a read-lock by transaction a results in the respective lock request being queued behind the read-lock of transaction b (R(b)<QE(a) or R(b)<QR(a)). Error conditions result if transaction a issues a release lock request (E_Unlock(a) or R_Unlock(a)) and transaction a does not hold such a lock.

State: E(c)<QR(b)

If an exclusive-lock is held on an object by transaction c and transaction b has a read-lock queued, an exclusive-lock request or a read-lock request from a different transaction a results in the read-lock of transaction a being queued (E<QR(b)<QE(a) or E<QR(b)<QR(a)). If it is assumed that the present exclusive-lock is held by transaction a, a release exclusive-lock request by transaction a results in the granting of the read-lock to transaction b (R(b)). A release read-lock request from transaction a where a does not hold a read-lock results in an error.

State: E(c)<QE(b)

An exclusive-lock request from transaction a results in the exclusive-lock request being queued (E<QE(b)<QE(a)). Similarly, a read-lock request from transaction a results in the read-lock request being queued (E<QE(b)<QR(a)). If transaction a presently hold the exclusive-lock, a release exclusive-lock request from transaction a results in the exclusive lock being granted to transaction b (E(b)). A release read-lock request from transaction a where a does not hold a read-lock results in an error.

State: R(b)<R(c)

If transactions b and c presently hold read-locks (R(b)<R(c)) and transaction a issues an exclusive-lock request, the exclusive-lock request is queued behind the read-locks (R(b)<R(c)<QE(a)). A read-lock request from transaction a is granted (R(b)<R(e)<R(a)). Errors result if transaction a attempts to release either an exclusive-lock or a read-lock and transaction a does not hold either type of lock.

State: R(a)<R(b)

An exclusive-lock request from transaction a when a already holds a read-lock along with transaction b results in a queued upgrade-lock (R(b)<QU(a)). An upgrade lock requests exists when a transaction requests an exclusive-lock for a record for which it already holds a read-lock. The transaction requesting the exclusive-lock keeps the read-lock until the exclusive-lock can be granted. If transaction a issues a read-lock request, no new lock is granted. However, the use-count for the read-lock by transaction a is incremented. A request by transaction a to release an exclusive-lock when transaction a holds only a read-lock results in an error. A request by transaction a to release a read-lock it holds results in that lock being released. All other read-locks for that record held by other transactions, in this case transaction b, will remain (R(b)).

State: R(b)<QU(c)

If transaction a issues an exclusive-lock request, it is queued behind the read-lock and the upgrade-lock (R(a)<QU(c)<QE(a)). Similarly, a read-lock request from transaction a is queued behind the present read lock and queued upgrade-lock (R(a)<QU(c)<QR(a)). Errors result if transaction a attempts to release either an exclusive-lock or a read-lock and transaction a does not hold either type of lock.

State: R(a)<QU(b)

The Local Lock Control elements 72a–d perform a single check for deadlock avoidance. That is, if transaction a issues an exclusive-lock request when it presently holds a read-lock, and transaction b has a queued upgrade-lock request, then the exclusive-lock request from transaction a is rejected with a DEADLOCK status. If transaction a issues another read-lock request, the use-count for the read-lock is incremented. An error results if transaction a issues a release exclusive-lock request when a does not hold an exclusive-lock. When transaction a issues a release read-lock request, the queued upgrade-lock is made an exclusive-lock (E(b)).

Figure 6:
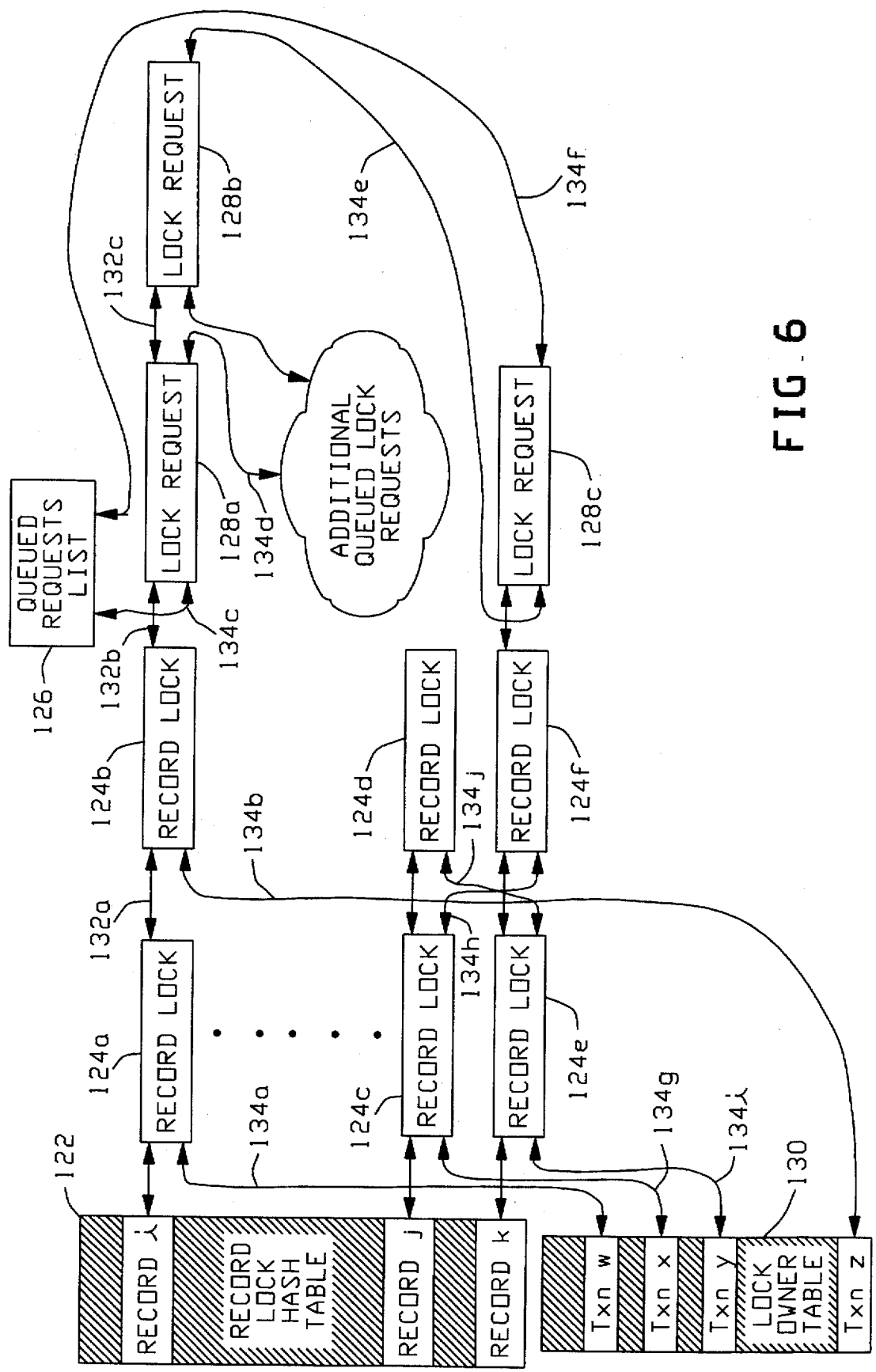
FIG. 6 illustrates an example of the locks and lock requests that are associated with three records, i, j, and k.
Figure 7:
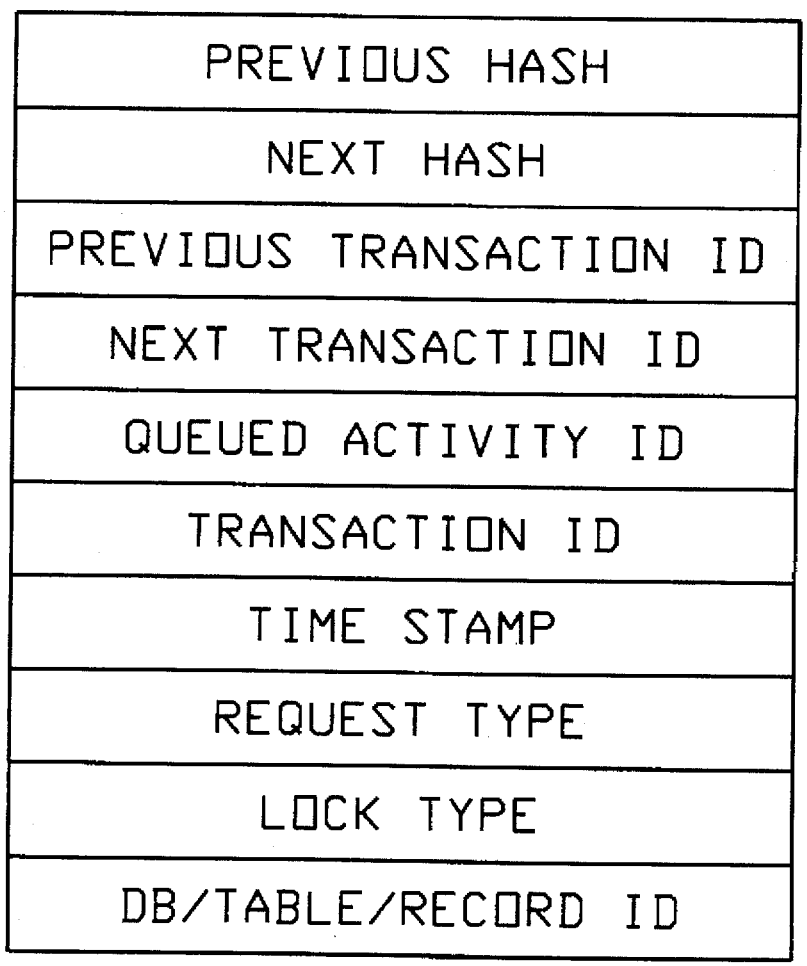
FIG. 7 shows the content of Record Lock and Lock Request structures.

FIGS. 6 and 7 illustrate the data structures used by the Local Lock Control elements 72a–d to manage local locks. FIG. 6 illustrates an example of the locks and lock requests that are associated with three records, i, j, and k. The Record Lock Hash Table 122 is a structure that is used to reference the lock status for records in a database. When a lock request is received, a hash function is applied to the referenced record to obtain an index into the Record Lock Hash Table. Each entry in the Hash Table contains a pointer to a doubly linked list of Record Lock structures 124a–d.

A Lock Status List identifies the locks that have been granted for a particular database object as well as the pending lock requests. The Lock Status List associated with record i contains Record Locks 124a–b, the Lock Status List associated with record j contains Record Locks 124c–d, and the Lock Status List associated with record k contains Record Lock 124e–f.

A Queued Requests List 126 is used for managing requests for locking records for which there is presently a conflicting lock held by another truncation. For efficient management of queued Lock Requests, the Lock Requests are stored in the same type of structure as are Record Locks, and the Lock Requests are linked to the appropriate Lock Status List. For example, Lock Requests 128a and 128b are linked in the Lock Status List of record i. Lock Requests 128a and 128b are waiting for the release of Record Locks 124a and 124b. Likewise, Lock Request 128c is linked to Record Locks 124e and 124f on the Lock Status List of record k.

The Queued Requests List is a doubly linked list of Lock Requests 128a–c that is interlinked with various ones of the Lock Status Lists. The first Lock Request on the Queue Requests List 126 is Lock Request 128a, which references additional queued Lock Requests. Another one of the additional Lock Requests references Lock Request 128b, which is linked to the last Lock Request 128c in the Queued Requests List 126. The Lock Requests 128a–c on the Queued Requests List are ordered by the time each has spent on the Queued Requests List.

A Lock Owner Table 130 is used for managing locks that are associated with particular transactions. The Lock Owner Table is used in releasing all locks belonging to a transaction. The Record Locks that are owned by a particular transaction are interlinked with various ones of the Lock Status Lists. An entry in the Lock Owner Table contains a Transaction ID and a pointer to a Record Lock structure. In the example of FIG. 6, Transactions w, x, y, and z denote the transactions that own Record Locks 124a–f. Record Lock 124a is the only lock belonging to transaction w, Record Lock 124b is the only Record Lock belonging to transaction x, Record Locks 124c and 124f both belong to transaction y, and Record Locks 124e and 124d both belong to transaction z. An entry on a Lock Status List is linked to either one of the Lock Owner lists in the Lock Owner Table or to the Queue Requests List 126, but not both.

FIG. 7 shows the content of Record Lock and Lock Request structures 124. The same type of structure is used for storing both Record Locks and Lock Requests, thereby allowing the Lock Requests to be linked to the Record Locks.

The Previous Hash and Next Hash fields are pointers that are used to link either a Record Lock or a Lock Request into a Lock Status List. For example, referencing the Lock Status List of record i in FIG. 6, the bi-directional Link 132a includes the Previous Hash of Record Lock 124b and the Next Hash of Record Lock 124a, Link 132b includes the Previous Hash of Lock Request 128a and the Next Hash of Record Lock 124b, and Link 132c includes the Previous Hash of Lock Request 128b and the Next Hash of Lock Request 128a.

The Previous Transaction ID and Next Transaction ID fields are pointers that are used to either link Record Locks 124a–f into a list in the Lock Owner Table 130 or to link Lock Requests 128a–c into the Queued Requests List 126. For example, Link 134a includes the Previous Transaction ID of Record Lock 124a to reference the entry for transaction w in the Lock Owner Table 130, and Link 134b includes the Previous Transaction ID of Record Lock 124b to reference transaction z in the Lock Owner Table. Link 134c links the Lock Request 128a to the head of the Queued Requests List and includes the Previous Transaction ID of Lock Request 128a. Link 134d includes the Next Transaction ID of Lock Request 128a and the Previous Transaction ID of one of the additional queued Lock Requests. Link 134e includes the Previous Transaction ID of Lock Request 128c and the Next Transaction ID of Lock Request 128b. In the example of FIG. 6, Lock Request 128c is the last Lock Request in the Queued Requests List. Therefore, the Next Transaction ID of Lock Request 128c references the head of the Queued Requests List, and the tail of the Queued Requests List references Lock Request 128c as indicated by link 134f. A new Lock Request would be placed at the tail of the Queued Request List, that is, it would be linked to Lock Request 128c. This maintains the time ordering of the Queued Requests List 126.

It should be noted that the Record Locks belonging to transaction x are Record Lock 124c and Record Lock 124f as illustrated by Links 134g and 134h. Similarly, Links 134i and 134j illustrate that Record Locks 124e and 124d belong to transaction y.

The Queued Activity ID field in the Lock Request structure 124 is used to uniquely identify the activity on one of the Compute Nodes 12a–z that is waiting for a lock to be granted. A unique Compute Node identifier is combined with a process identifier for the activity to obtain the Queued Activity ID. When a lock is granted for a Lock Request, the Queued Activity 133 is used to identify the process to be activated.

The Transaction ID field in the Record Lock and Lock Requested structure 124 identifies the transaction that owns a Record Lock 124a–f or the transaction that submitted a Lock Request 128a–c. For a Record Lock, the Transaction ID field is the same as an entry in the Lock Owner Table 130, and for a Lock Request, the Transaction ID is used to update an entry in the Lock Owner Table when a lock is granted.

The Time Stamp field contains the time at which the respective Lock Request 128a–c was placed on the Queued Requests List 126. After a Lock Request has been queued for longer than a predetermined period of time, it is reported to the Deadlock Detector 92.

The Request Type field is used to identify the type of request: Lock (lock the identified database object), Unlock (unlock the identified object), and Query (query the status of the identified database object). The Lock Type identifies the type of lock granted or requested, and for the purposes of the present exemplary embodiment is either a read-lock or an exclusive-lock. The DB/Table/Record ID field identifies the particular object that is locked or requested to be locked.

Figure 8:
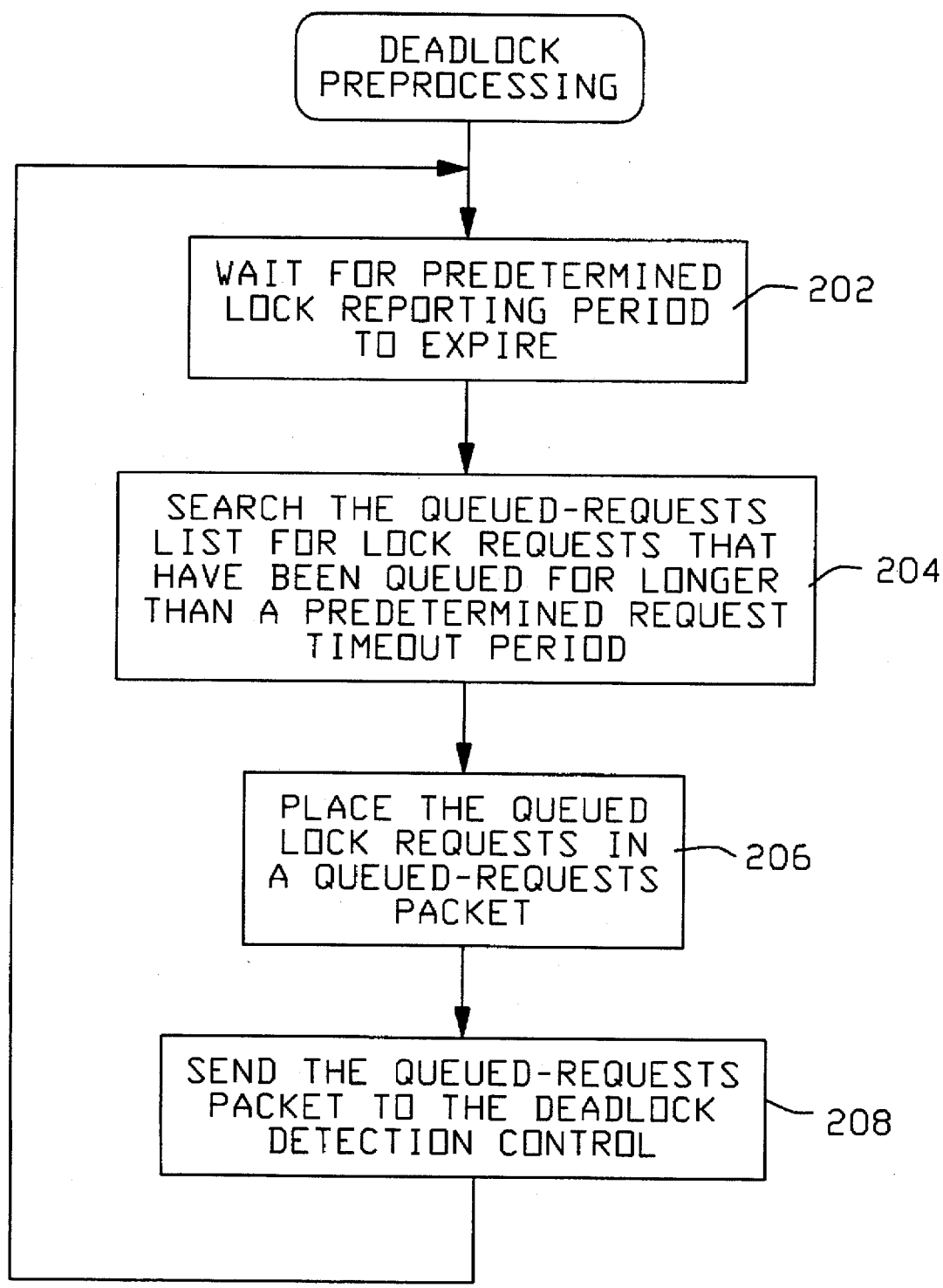
FIG. 8 is a flowchart of the processing for each of the Deadlock Preprocessor elements.

FIG. 8 is a flowchart of the processing for each of the Deadlock Preprocessor elements 74a–d. Each Deadlock Preprocessor performs a periodic scan of the Queued Requests List 126 for Lock Requests 128a–c that have been queued for longer than a predetermined period of time. The Lock Requests whose lime in the Queued Requests List exceeds a predetermined period of time (the Request Timeout Period) are reported to the Deadlock Detector 92.

At Step 202, the Deadlock Preprocessor remains inactive for a predetermined period of time. The time that the Deadlock Preprocessor remains inactive is referred to as the Lock-Reporting Period and is set as a system configuration parameter for the parallel database system The Lock Reporting Period may be adjusted by a database administrator according to the likelihood of deadlocks. The Deadlock Preprocessor is activated after the Lock-Reporting Period has passed. Upon activation, control is directed to Step 204.

The Queued-Requests List 126 is searched at Step 204. Only those Lock Requests 128a–c that have been queued for a predetermined period of time are reported to the Deadlock Detector 92, rather than reporting all Lock Requests on the Queued-Requests List. Because the Queued Requests List is ordered according to the Time Stamps of the Lock Requests 128a–c, processing of the Queued Requests List begins at the head of the list and proceeds until a Lock Request is encountered whose Time Stamp indicates that its time in the list is less than the Request Time-out period. Referencing FIG. 6, Lock Request 128a is the first Lock Request that is checked. If its Time Stamp indicates that it has been queued longer than the Request Time-out Period, an entry is placed in the Queued Requests Packet, as indicated by Step 206, that will be sent to the Deadlock Detector.

Once all the timed-out Lock Requests are identified and entries placed in a Queued-Requests Packet, the Packet is sent from a Deadlock Preprocessor element 74a–d to the Deadlock Detector 92 using common message passing techniques.

Figure 9:
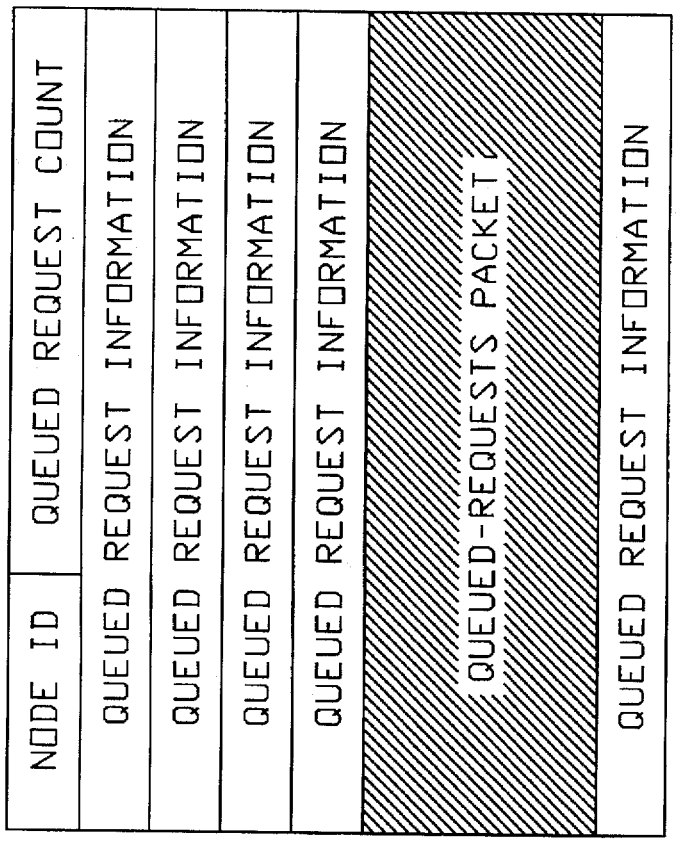
FIG. 9 illustrates the content of the Queued-Requests Packet.

FIG. 9 illustrates the content of the Queued-Requests Packet 252. A Queued-Requests Packet identifies transactions that are waiting for a lock at one of the Database Server Nodes 62a–d. Each of the Database Server Nodes periodically sends a Queued-Requests Packet to the Deadlock Detector 92. The Deadlock Detector combines the Queued-Requests Packets it receives and checks for deadlocks.

The Node ID field in the Queued-Requests Packet 252 identifies the Database Server Node 62a, 62b, 62c, or 62d from which the Queued-Requests Packet was sent. The Queue Request Count field specifies the number of Queued Request Information entries in the Queued-Requests Packet.

Figure 10:
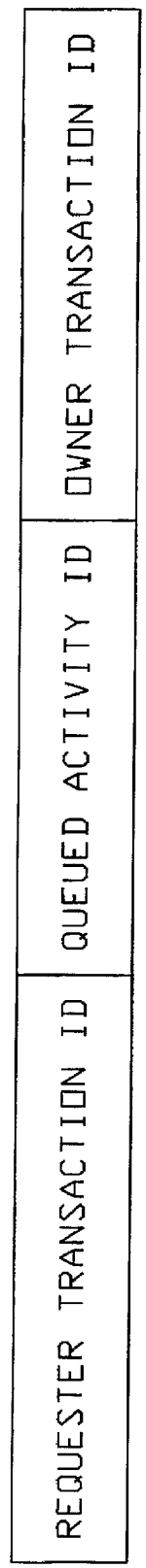
FIG. 10 shows the content of the Queued Request Information.

FIG. 10 shows the content of the Queued Request Information 253. The Requester Transaction ID identifies the transaction that submitted the lock request and is waiting for the lock to be granted. The Queued Activity ID is the process identifier that uniquely identifies the process within the parallel database system that is inactive and waiting for the lock to be granted. The Owner Transaction ID identifies the transaction that presently owns the lock. For a Queued Request Information entry, the Transaction ID and the Queued Activity ID from a Lock Request 128a–c are respectively used for the Requester Transaction ID and Queued Activity ID fields, and the Transaction 113 from a Record Lock 128a–f is used for the Owner Transaction ID field.

The interlinking of the Record Lock list, the Lock Owner list, and the Queued Requests List, as illustrated in FIG. 6, enhances the efficiency of processing performed by the Local Lock Control elements 72a–d. The processing is efficient because lock conflicts may be quickly identified by following the Hash links in the Record Lock or Lock Request Structures 124 and 128 to determine there are the lock conflicts. Record Locks and Lock Requests are linked via the Hash links reflecting the conditions shown in FIG. 5. The Queued Requests are linked on the Queued Request List 126 in time order. The Queued Request links are followed to find deadlock candidates. The deadlock candidates' Hash links (e.g., 124a and 124b) may then be used to construct the Queued-Requests Packet 252. Once a lock request has been granted, it is linked to the appropriate Lock Owner Table entry (e.g., 134g or 134l). This facilitates rapid release of all of a transaction's locks upon transaction termination.

FIG. 11 illustrates the Queued-Requests Packet that would be submitted for the example of FIG. 6, assuming that the Database Server Node is Node 62a and that all Lock Requests have been queued for more than the Request Time-out period.

Lock Request 128a has two Queued Request Information entries in the Packet 254, one for each of the Record Locks 124a and 124b for record i. The two entries are used to indicate to the Deadlock Detector 92 that the transaction of Lock Request 128a, transaction t, is waiting on locks held by transaction z and transaction w. The values for the Requester Transaction ID fields are taken from the Transaction ID field of Lock Request 128a, and the values for the Queued Activity ID fields are taken from the Queued Activity ID field of the Lock Request 128a. The first Owner Transaction ID is transaction z and the second is transaction w. The values for the Owner Transaction ID fields are taken from the Transaction ID field in the respective Record Locks 124a and 124b. For purposes of illustration, it can be seen that transaction w owns Record Lock 124a and transaction z owns Record Lock 124b by way of Links 134a and 134b. Similarly, transaction u of Lock Request 128b is waiting for transactions z and w. Transaction v of Lock Request 128c is waiting on transactions x and y, which respectively own Record Locks 124f and 124e.

Figure 12:
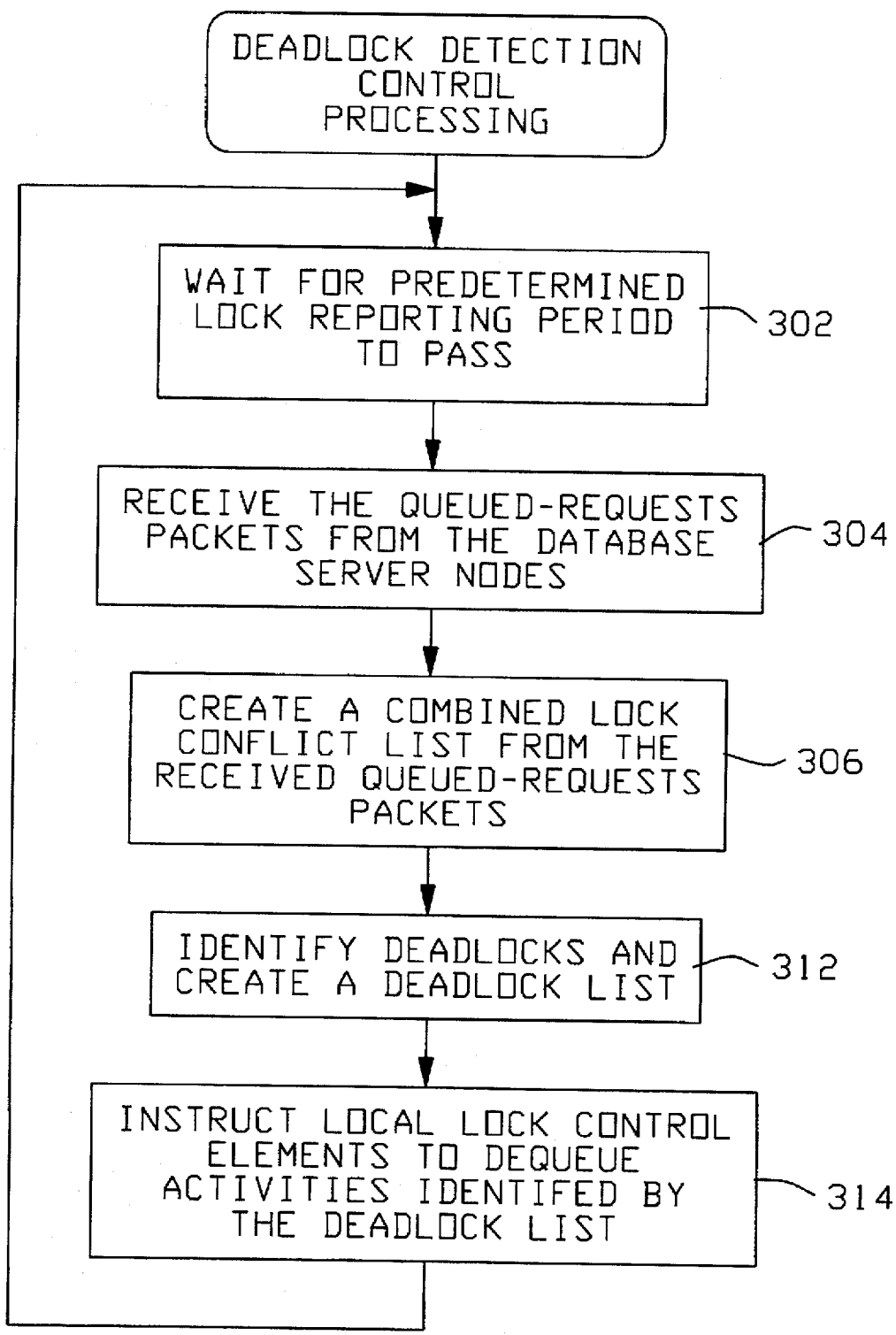
FIG. 12 is a flowchart of the processing performed by the Deadlock Detector.

FIG. 12 is a flowchart of the processing performed by the Deadlock Detector 92. The Deadlock Detector receives Queued-Requests Packets 254 from each of the Deadlock Preprocessor elements 74a–d. When all of the Deadlock Preprocessor elements have reported, the waiting transactions are examined for deadlocks.

At Step 302, the Deadlock Detector waits for a predetermined period of time, which is specified by the Lock Reporting Period, to perform a periodic check for deadlocks. Upon activation, the Queued-Requests Packets from the Database Server Nodes 62a–d are received by the Deadlock Detector according to common message passing methods, as shown by Step 304. All of the Database Server Nodes 62a–d send a Queued-Requests Packet, even if a Server Node has no queued Lock Requests.

Figures 13, 14:
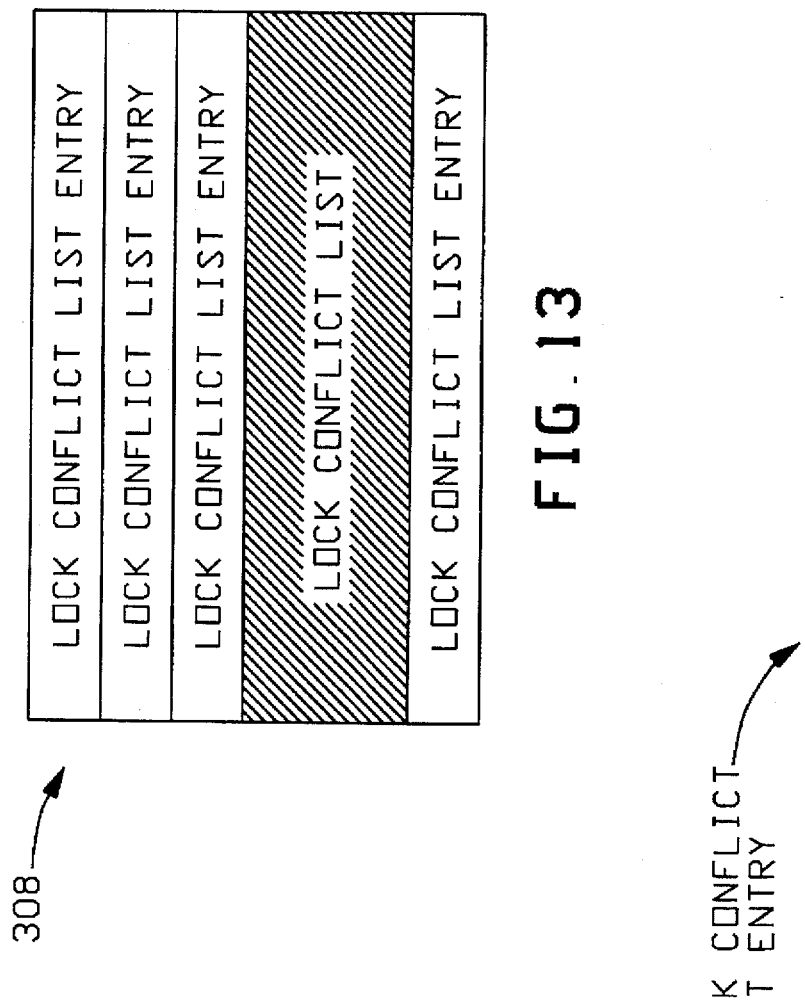
FIG. 13 illustrates the Lock Conflict List.
FIG. 14 shows the content of a Lock Conflict List Entry.

At Step 306, a Lock Conflict List is created from all the received Queued-Requests Packets. FIG. 13 illustrates the Lock Conflict List 308, and FIG. 14 shows the content of a Lock Conflict List Entry 3 10. The Requester Transaction ID, Queued Activity ID, and Owner Transaction ID of a Lock Conflict List Entry represent the same information from the Queued Request Information entries of the Queued-Requests Packet 252. Each Lock Conflict List Entry includes a Control ID field that is used for bookkeeping during deadlock detection processing. The Control ID is used to store a Requester Transaction ID for which deadlock is being checked.

Step 312 processes the Lock Conflict List 308 according to the pseudo-code processing set forth below for deadlock_check and check_holder. Deadlock_check processing examines each entry in the Lock Conflict List 308 to determine whether the entry is part of a deadlock cycle in the Lock Conflict List. If the Lock Conflict List Entry 308 is part of a deadlock cycle, then the entry is added to a deadlock list (not shown). An entry is not added to the deadlock list if there is an entry with a matching Requester Transaction ID already present in the deadlock list. The deadlock list consists of the accumulation of Lock Conflict List Entries found to be part of deadlock cycles.

Deadlock_check processing initiates check_holder processing to determine whether the Requester Transaction D is part of a deadlock cycle. The check_holder processing is a recursive function that takes as inputs an index into the Lock Conflict List 308 and the Owner Transaction D that corresponds to the Requester Transaction ID in process. Check_holder returns a 1 if a deadlock cycle is detected and a 0 if no cycle was detected.

Check_holder processing searches the Lock Conflict List 306 for an entry in which the Owner Transaction D that is passed as input is also a Requester Transaction ID. If such an entry is found, and if the Owner Transaction ID of that entry is the Check_cycle_id (the Requester Transaction D from deadlock_check), then a deadlock cycle has been detected and a value of 1 is returned. If the Control IF field of the Lock Conflict List Entry 308 has previously been set to Check_cycle_D, a value of 0 is returned because the path in process has already been checked for a deadlock cycle; otherwise, the Control D field is set to the Check_cycle_id, and the check_holder function processing is recursively invoked with the same start_index from the initial invocation and the Owner Transaction ID of the Lock Conflict List Entry in which the Owner Transaction ID that was passed as input is also a Requester Transaction D. If a recursive call to check_holder returns a 1, then the calling check_holder function returns a 1.

```
deadlock_check
for i = 1 to the number of entries in the Lock Conflict List
        save the Lock Conflict List[i].Requester Transaction ID as
                Check_cycle_ID
        if check_holder (i, Conflict List [i].Owner
        Transaction ID) = 1
                add the Lock Conflict List [i] entry to the
                Deadlock List
        end if
end for
return
check_holder (start_index, check_txn_id)
for j = start_index to the number of entries in the
Lock Conflict List
        if check_txn_id = Lock Conflict List
        [j].Requester Transaction ID
```

-continued

```
        if Lock Conflict List [j].Owner Transaction
        ID = Check_cycle_ID
                return 1
        end if
        if Lock Conflict List [j].Control ID =
        Check_cycle_ID
                return 0
        end if
        Lock Conflict List [j].Control ID =
        Check_cycle_ID
        if check_holder (start_index,
                        Lock Conflict List [j]. Owner
                        Transaction ID) = 1
                return 1
        end if
    end if
end for
return 0
```

Step 314 processes the deadlock list by instructing the Local Lock Control elements 72a–d to release the Record Locks 124 and dequeue Lock Requests 128 associated with the Queued Activity ID of entries in the deadlock fist. Communication between the Deadlock Detector element 92 and the Lock Control elements is accomplished via common message passing techniques. The particular Local Lock Control element to which a message is sent is determined from the Queued Activity ID. The Local Lock Control elements dequeue the queued activities.

While described in terms of concurrency control for database systems, those skilled in the art will recognize that the concepts described herein could be generalized for locking other objects in distributed and parallel data processing systems.

Having described an exemplary embodiment of the invention in the drawings and accompanying description, those skilled in the art will recognize that various modifications to the exemplary embodiment could be made without departing from the scope and spirit of the claims set forth below:

We claim:

1. A method for lock management in a parallel dam processing system having a plurality of computing nodes, a plurality of processing activities active on selectable ones of the computing nodes, and a plurality of selectable objects to lock, wherein a local lock control element is available on each of the plurality of computing nodes for coordinating locking of objects that are local to a respective computing node, and a global deadlock detector is established on a predetermined one of the computing nodes, the method comprising the steps of:

submitting object lock requests from the processing activities to the local lock control elements, wherein each object lock request indicates an object to lock;

granting a lock for an object if there is not a lock conflict for said object, whereby a respective processing activity is identified as a lock owner for said object;

enqueuing an object lock request if there is a lock conflict, whereby a respective processing activity is identified as a queued lock-requester for said object;

identifying timed-out requests, wherein said timed-out requests are object lock requests that have been queued for longer than a predetermined period of time;

reporting to the global deadlock detector queued lock-requesters of said timed-out requests and respective lock owners for objects of said timed-out requests;

detecting deadlocked queued lock-requesters at the global deadlock detector; and instructing said local lock control elements to release locks held by said deadlocked queued lock-requesters and to release timed-out requests of said deadlocked queued lock-requesters.

2. The method of claim 1, wherein said identifying, reporting, and detecting steps are performed periodically.

3. The method of claim 2, wherein said reporting step comprises the step of reporting a requester-owner pair for each queued lock-requester of said timed-out requests in combination with lock owners of objects specified in said timed-out requests.

4. The method of claim 1, wherein said reporting step comprises the step of reporting a requester-owner pair for each queued lock-requester of said timed-out requests in combination with lock owners of objects specified in said timed-out requests.

5. A method for lock management in a parallel data processing system having a plurality of computing nodes, a plurality of processing activities that are active on selectable ones of the computing nodes, and a plurality of selectable objects to lock, wherein a local lock control element is available on each of the plurality of computing nodes for coordinating locking of objects that are local to the respective computing nodes, a global deadlock detector is established on a predetermined one of the computing nodes, and a deadlock preprocessor is established on each of the computing nodes, the method comprising the steps of:

submitting object lock requests from the processing activities to the local lock control elements, wherein each object lock requests indicates an object to lock;

granting a lock for an object if there is not a lock conflict for said object, whereby a respective processing activity is identified as a lock owner for said object;

enqueuing an object lock request if there is a lock conflict, whereby a respective processing activity is identified as a queued lock-requester for said object;

performing steps (i) and (ii) by each of the deadlock preprocessors:
   (i) identifying timed-out requests, wherein said timed-out requests are object lock requests that have been queued for longer than a predetermined period of time;
   (ii) reporting to the global deadlock detector queued lock-requesters of said timed-out requests and respective lock owners for objects of said timed-out requests;

detecting deadlocked queued lock-requesters at the global deadlock detector; and instructing said local lock control elements to release locks held by said deadlocked queued lock-requesters and to release timed-out requests of said deadlocked queued lock-requesters.

6. The method of claim 5, wherein said identifying and said reporting steps are performed periodically; and said detecting step is performed periodically by said global deadlock detector.

7. The method of claim 6, wherein said reporting step comprises the step of reporting a requester-owner pair for each queued lock-requester of said timed-out requests in combination with lock owners of objects specified in said timed-out requests.

8. The method of claim 5, wherein said reporting step comprises the step of reporting a requester-owner pair for each queued lock-requester of said timed-out requests in combination with lock owners of objects specified in said timed-out requests.

9. A method for lock management in a parallel data processing system having a plurality of computing nodes, a plurality of processing activities active on selectable ones of the computing nodes, and a plurality of selectable objects to lock, wherein a local lock control element is available on each of the plurality of computing nodes for coordinating locking of objects that are local to the respective computing nodes, a global deadlock detector is established on a predetermined one of the computing nodes, and a deadlock preprocessor is established on each of the computing nodes, the method comprising the steps of:

submitting object lock requests from the processing activities to the local lock control elements, wherein each object lock request indicates an object to lock;

granting a lock for an object in response to an object lock request if there is not a lock conflict for said object, whereby a respective processing activity is identified as a lock owner for said object, and wherein said granting step comprises the step of linking a lock structure to a lock-list having other lock structures for said object;

enqueuing an object lock request if there is a lock conflict for an object specified in said object lock request, whereby a respective processing activity is identified as a queued lock-requester for said object, and wherein said enqueuing step comprises the steps of (a) and (b);

(a) linking a request structure for said object lock request to a queue-list of other request structures; and (b) linking said request structure to a corresponding lock-list of said object;

performing steps (c) through (e) by each of the deadlock preprocessors;

(c) scanning said queue-list for timed-out requests, wherein a timed-out request is a request structure that has been queued for longer than a predetermined period of time;

(d) assembling a requester-owner pair for each lock-requester of said timed-out requests in combination with lock owners of objects of said timed-out requests;

(e) reporting said requester-owner pairs to the global deadlock detector;

detecting deadlocked queued lock-requesters at the global deadlock detector from said requester-owner pairs; and instructing said local lock control elements to release locks held by said deadlocked queued lock-requesters and to release timed-out requests of said deadlocked queued lock requesters.

10. The method of claim 9, wherein said scanning step is performed periodically by the deadlock preprocessors; and said detecting is performed periodically by said global deadlock detector.

11. An apparatus for lock management in a parallel data processing system having a plurality of computing nodes, a plurality of processing activities active on selectable ones of the computing nodes, and a plurality of selectable objects to lock, wherein a local lock control element is available on each of the plurality of computing nodes for coordinating locking of objects that are local to the respective computing nodes, a global deadlock detector is established on a predetermined one of the computing nodes, the apparatus comprising:

lock-grant means within the lock control elements for granting a lock for an object in response to an object lock request if there is not a lock conflict and for identifying a respective processing activity as a lock owner for said object;

enqueue means within the lock control elements for enqueuing said object lock request if there is a lock conflict and for identifying a respective processing activity as a queued lock-requester for said object;

identification means coupled to said enqueue means for identifying timed-out requests, wherein said turned-out requests are object lock requests that have been queued for longer than a predetermined period of time; and report means coupled to said identification means for reporting to the global deadlock detector queued lock-requesters of said timed-out requests and respective lock owners for objects of said timed-out requests;

detection means within the global deadlock detector for detecting deadlocked queued lock-requesters; and instruction means coupled to said detection means for instructing the local lock control elements to release locks held by said deadlocked queued lock-requesters and to release timed-out requests of said deadlocked queued lock-requesters.

12. The apparatus of claim I 1, wherein said identification means includes means for periodically identifying said timed-out requests;

said report means includes means for periodically reporting to the global deadlock detector queued lock-requesters of said timed-out requests and respective lock owners for objects of said timed-out requests; and said detection means includes means for periodically detecting said deadlocked queued lock-requesters.

13. A parallel database deadlock detection system, comprising:

a mesh network;

a plurality of compute nodes coupled to said mesh network;

a plurality of database servers, predetermined ones of which are active on predetermined ones of said plurality of compute nodes;

a plurality of database clients, predetermined ones of which are active on predetermined ones of said plurality of compute nodes, wherein each of said plurality of database clients is coupled to each of said plurality of database servers;

a plurality of local lock control elements, wherein each of said plurality of database servers has an associated lock control element and each of said plurality of local lock control elements processes lock requests from each of said plurality of database clients, wherein each of said lock control element comprises lock-grant means for granting a lock for an object in response to a lock request if there is not a lock conflict and for identifying a respective database client as a lock owner for said object; and enqueue means for enqueuing said lock request if there is a lock conflict and for identifying a respective database client as a queued lock-requester for said object;

a plurality of deadlock preprocessors, wherein each of said plurality of database servers has an associated deadlock preprocessor; and a deadlock detector coupled to each of said plurality of deadlock preprocessors, wherein each of said deadlock preprocessors reports queued lock-requesters and respective lock owners for objects of queued lock requests to said deadlock detector, and said deadlock detector checks for deadlocked queued lock-requesters and instructs said local lock control elements to release locks held by said deadlocked queued lock-requesters and to release queued lock requests of said deadlocked queued lock-requesters.

14. The system of claim 13, wherein each of said deadlock preprocessors includes means for identifying timed-out requests, wherein said timed-out requests are queued lock requests that have been queued for longer than a predetermined period of time.

15. The system of claim 14, wherein each of said plurality of deadlock preprocessors includes means for periodically notifying said deadlock detector of said timed-out requests.

16. The system of claim 13, wherein said deadlock detector includes means for periodically detecting said deadlocked queued lock-requesters.

* * * * *

UNITED STATES PATENT AND TRADEMARK OFFICE
CERTIFICATE OF CORRECTION

PATENT NO. : 5,682,537
DATED : October 28, 1997
INVENTOR(S) : John W. Davies
John H. McClintock It is certified that error appears in the above-identified patent and that said Letters Patent is hereby corrected as shown below:

Column 15, Line 40    "dam" should be "data".

Column 18, Line 26    "I 1" should be "11".

Signed and Sealed this

Twenty-seventh Day of January, 1998

Attest:

BRUCE LEHMAN

*Attesting Officer*     *Commissioner of Patents and Trademarks*